(12) United States Patent
Hirakawa

(10) Patent No.: US 8,307,424 B2
(45) Date of Patent: Nov. 6, 2012

(54) PASSWORD AUTHENTICATION APPARATUS AND PASSWORD AUTHENTICATION METHOD

(75) Inventor: Yutaka Hirakawa, Tokyo (JP)

(73) Assignee: Shibaura Institute of Technology, Tokyo (JP)

( * ) Notice: Subject to any disclaimer, the term of this patent is extended or adjusted under 35 U.S.C. 154(b) by 439 days.

(21) Appl. No.: 12/354,463

(22) Filed: Jan. 15, 2009

(65) Prior Publication Data

US 2010/0017875 A1    Jan. 21, 2010

(30) Foreign Application Priority Data

Jul. 17, 2008   (JP) .................................. 2008-185635

(51) Int. Cl.
  *G06F 21/00* (2006.01)
(52) U.S. Cl. ................ 726/19; 726/16; 726/17; 726/18; 726/20; 713/155; 713/156; 713/157; 713/158; 713/159
(58) Field of Classification Search .............. 726/16–20; 713/155–159
See application file for complete search history.

(56) References Cited

U.S. PATENT DOCUMENTS

| | | | | |
|---|---|---|---|---|
| 5,428,349 A | * | 6/1995 | Baker | 340/5.54 |
| 6,209,104 B1 | * | 3/2001 | Jalili | 726/18 |
| 2006/0179471 A1 | * | 8/2006 | Roth | 726/2 |
| 2007/0239980 A1 | | 10/2007 | Funayama | |
| 2008/0317247 A1 | | 12/2008 | Jeong et al. | |
| 2009/0006941 A1 | * | 1/2009 | Yoshida | 715/227 |
| 2009/0013403 A1 | | 1/2009 | Morimoto | |

FOREIGN PATENT DOCUMENTS

| | | |
|---|---|---|
| JP | 2006-018358 | 1/2006 |
| JP | 2006-251985 | 9/2006 |
| JP | 2007-310515 | 11/2007 |
| JP | 2008-033924 | 2/2008 |

OTHER PUBLICATIONS

Notice of Reasons for Rejection for JP 2008-185635 mailed Apr. 15, 2010 (with English translation).
Tetsuji, T., and Hideki, K., "Awase-E: the Method Enables an Image-based Authentication to be More Secure and Familiar for Users with Providing Image Registration and User Notification," Transactions of Information Processing Society of Japan, 2003, vol. 44, Issue: 8, pp. 2002-2012.

* cited by examiner

*Primary Examiner* — Philip Chea
*Assistant Examiner* — Ghazal Shehni
(74) *Attorney, Agent, or Firm* — Foley & Lardner LLP

(57) ABSTRACT

A password authentication apparatus and a password authentication method for preventing the leakage of password information from user's password input operations includes a memory device for storing a correct answer symbol and selection information for selecting at least one input symbol for each digit of a password; a display for displaying combinations of input symbol candidates based on user operation; a processor for selecting, for each digit of the password, one or more input symbols from the combinations of input symbol candidates displayed by the display based on the selection information corresponding to the digit to determine whether the correct answer symbol corresponding to the digit is included in the selected one or more input symbols; and an authentication board for authenticating that the password is entered correctly when the processor determines that correct answer symbols for all the digits of the password are included.

6 Claims, 6 Drawing Sheets

100 k: NUMBER OF ROWS (A)

j: NUMBER OF COLUMNS (B)

n: NUMBER OF DATA (C)

p: NUMBER OF PASSWORD DIGITS (D)

PASSWORD AUTHENTICATION APPARATUS AND PASSWORD AUTHENTICATION METHOD

CROSS-REFERENCE TO RELATED PATENT APPLICATIONS

The entire disclosure of Japanese Patent Application No. 2008-185635, filed on Jul. 17, 2008, is expressly incorporated herein by reference.

BACKGROUND

The present disclosure relates to a password authentication apparatus and a password authentication method.

Conventionally, personal authentication has been required to limit the use of web services by persons other than an authorized user from a cellular phone, a PHS, or a PDA (Personal Digital Assistant). In general, the personal authentication is achieved by determining whether a password is entered correctly upon authentication using, for example, a four-digit personal identification number or a combination of plural alphanumeric characters (hereinafter referred to as "password").

However, conventional authentication methods using the password have a disadvantage that the password can be easily leaked out to a third party if the third party sees the user's input operations. Particularly, if the third party has taken photos or video of the user's input operations with a photographic device, such as a camera, at the time of password input, the third party can analyze the images and determine the password. As a result, the possibility of password "leakage" or compromise of a password increases.

Such a problem is particularly relevant to portable terminals, such as laptop computers or PDAs, because they are portable and hence the third party has increasing opportunities to see their screens.

Therefore, it is desirable to provide a password authentication apparatus and a password authentication method capable of reducing the risk of password information leakage even if a third party sees user's input operations.

SUMMARY

A representative password authentication apparatus includes a storage device for storing a correct answer symbol and selection information for selecting at least one input symbol for each digit of a password; a display device for displaying combinations of input symbol candidates based on user operation; a determination device for selecting, for each digit of the password, one or more input symbols from the combinations of input symbol candidates displayed by the display device based on the selection information corresponding to the digit to determine whether the correct answer symbol corresponding to the digit is included in the selected one or more input symbols; and an authentication device for authenticating that the password is entered correctly when the determination device determines that correct answer symbols for all the digits of the password are included.

The password authentication apparatus can be configured such that display device displays one symbol, selected from a group of plural symbols including the correct answer symbol, in each portion of an area, the selection information is information for specifying one or more portions from plural portions of the area, and the combinations of input symbol candidates are plural symbols displayed by the display device in the plural portions of the area.

The display device can also display one symbol, selected form a group of plural symbols including the correct answer symbol, in each portion arranged in a matrix with n rows and m columns (n≧1 and m≧2).

The selection information stored in the storage device can also be specified column information specifying a column of the matrix area of the display device.

Further, the display device can display the combinations of input symbol candidates by changing the symbol displayed in each portion to a symbol displayed in a portion adjacent in the row or column direction.

Further, the display device can display a different symbol in each portion included in the column.

The determination device can determine a symbol string of the password in order of digit.

The determination device can also determine a symbol string of the password cyclically for each digit of the password.

The authentication device can authenticate that the password is entered correctly even when the determination device determines that correct answer symbols for a digit(s) equal to or more than one but no more than p−1 in the number p of digits of the password (where p≧2).

A representative password authentication method includes: storing a correct answer symbol and selection information for selecting at least one input symbol for each digit of a password; displaying combinations of input symbol candidates based on user operation; selecting, for each digit of the password, one or more input symbols from the combinations of input symbol candidates displayed based on the selection information corresponding to the digit to determine whether the correct answer symbol corresponding to the digit is included in the selected one or more input symbols; and authenticating that the password is entered correctly when it is determined that the correct answer symbols for all the digits of the password are included.

As described above, according to at least one representative embodiment, since user's input operations are just to display the combinations of input symbol candidates, even if peeping at or taking unauthorized photos, a third party cannot know what input symbols among the combinations of input symbol candidates the user has entered as the password. Therefore, according to the present disclosure, even if the third party has seen the user's input operations, the leakage of password information can be prevented.

DETAILED DESCRIPTION

A representative embodiment will now be described with reference to the accompanying drawings.

Figure 1:
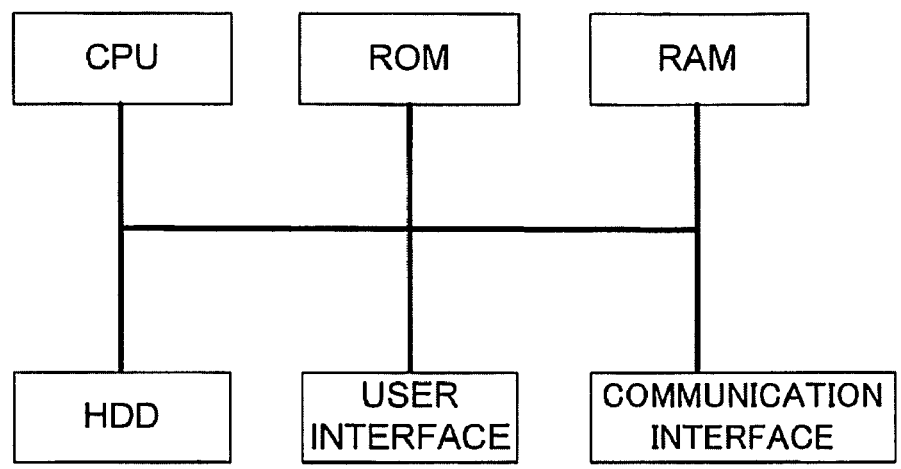
FIG. 1 is a schematic diagram illustrating the hardware configuration of a password authentication apparatus according to a representative embodiment.
Figure 2:
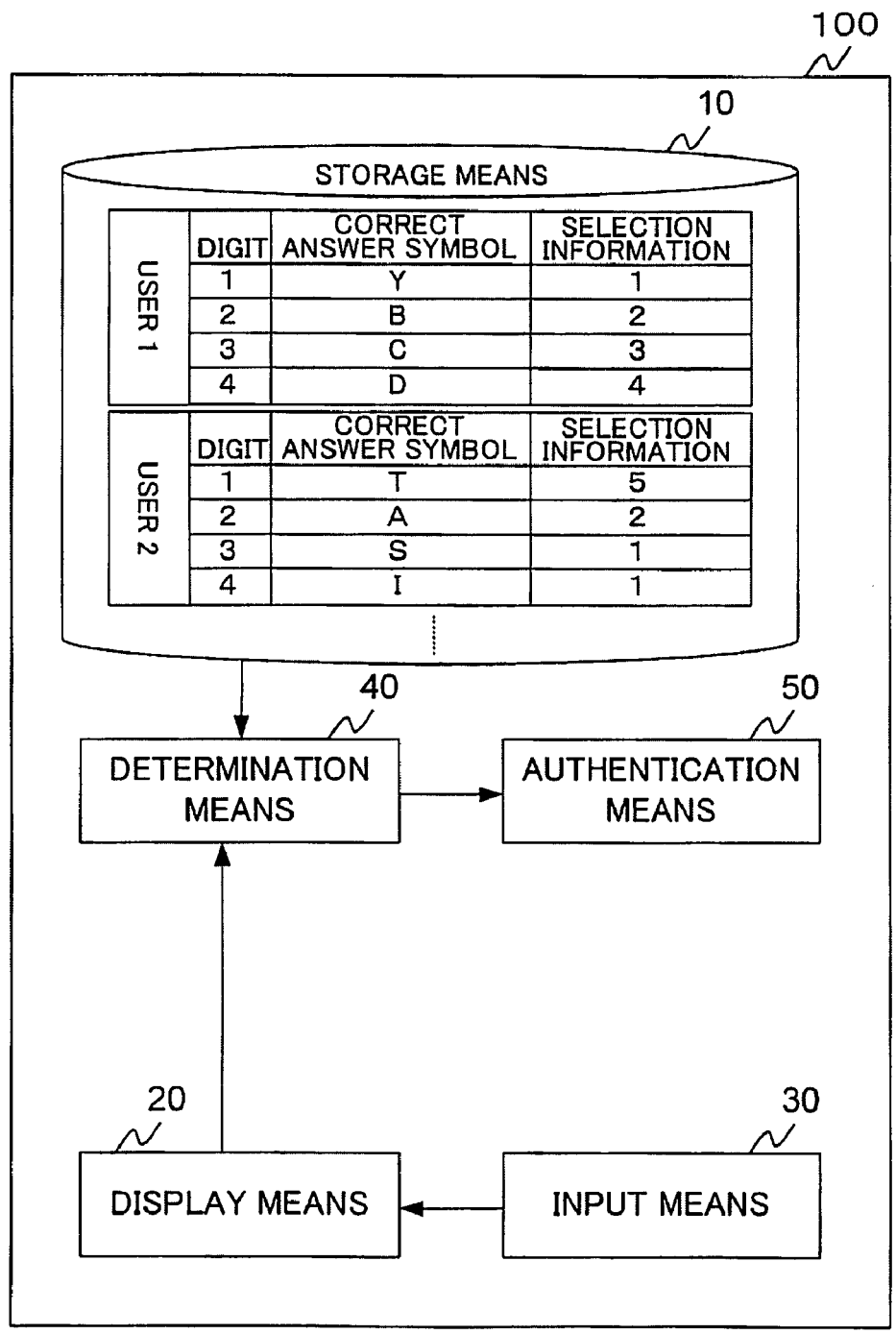
FIG. 2 is a functional block diagram illustrating the configuration of the password authentication apparatus according to a representative embodiment.

FIG. 1 is a schematic diagram illustrating the hardware structure of a password authentication apparatus 100 according to a representative embodiment. FIG. 2 is a functional block diagram of the password authentication apparatus 100 according to a representative embodiment.

Figure 3:
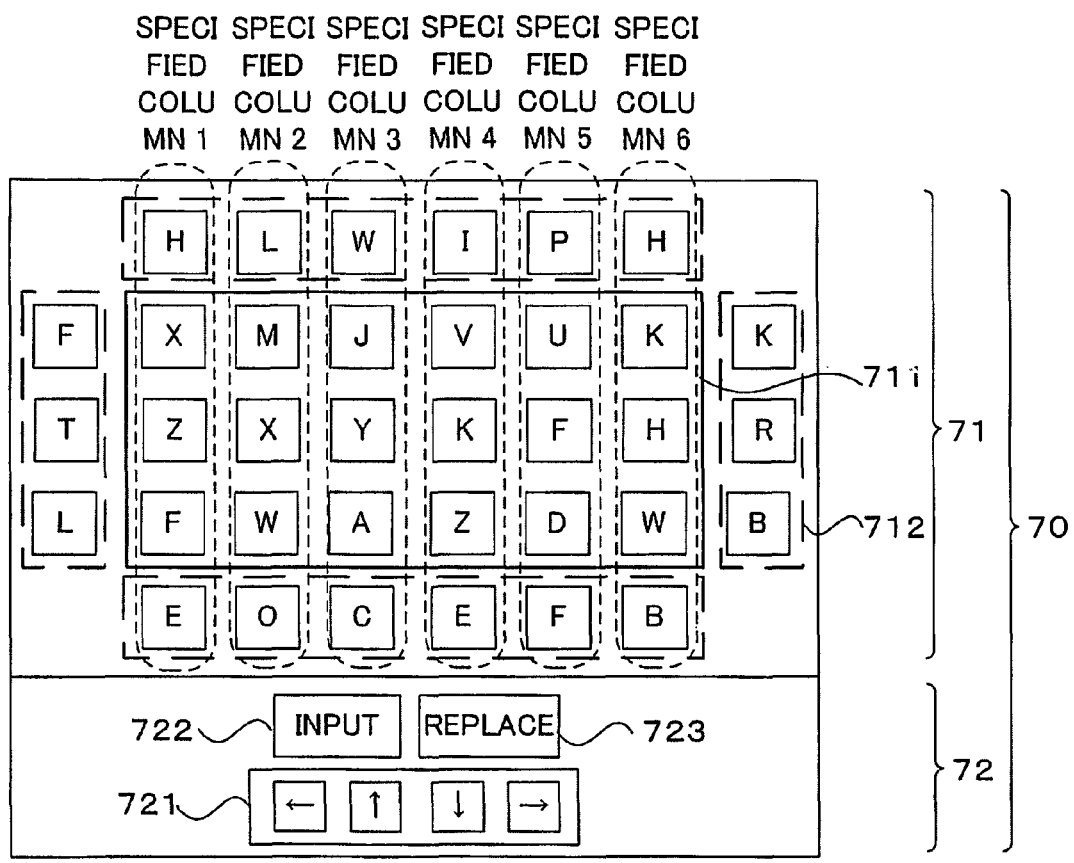
FIG. 3 is an illustration of an example of an authentication board of the password authentication apparatus according to a representative embodiment.

As illustrated in FIG. 1, the password authentication apparatus 100 has the same hardware structure as common computers. For example, it includes, as hardware, a CPU (central processing unit) consisting of a microprocessor and the like, a ROM, a RAM, an HDD, a user interface, a communication interface, etc. The password authentication apparatus 100 has, as the user interface, an authentication board 70 consisting of a display 71 and an operational panel 72 as illustrated in FIG. 3. The password authentication apparatus 100 can be physically either a dedicated system or a general-purpose information processing apparatus. For example, the password authentication apparatus 100 can be implemented by starting software, which defines each processing step of a password authentication method, installed in an information processing apparatus having a general structure.

As illustrated in FIG. 2, the password authentication apparatus 100 functionally has storage means 10, display means 20, input means 30, determination means 40, and authentication means 50.

The storage means 10 can include a memory device that stores a correct answer symbol and selection information for selecting at least one input symbol for each digit of a password of each authorized user. Here, the term "correct answer symbol" denotes a symbol for checking if a symbol input by the user is correct or not. For example, the correct answer symbols consist of characters and/or numbers. The selection information for selecting at least one input symbol is information used by the determination means 40 to be described later to select one or more input symbols from combinations of input symbol candidates. Note that the storage means 10 can be configured to store the password of only one authorized user, rather than storing the passwords of a plurality of authorized users.

The display means 20 can include a computer display that displays combinations of input symbol candidates based on user operation. The display means 20 displays one symbol, selected from a group of plural symbols including the correct answer symbol, in each portion of an area arranged in a matrix with n rows and m columns (n≧1 and m≧2) on the display. In other words, the display means 20 displays, on the display 71 of the authentication board 70, one symbol, selected from a group of plural symbols including the correct answer symbol, in each portion of an area (area for combinations of symbol candidates) 711 arranged in a matrix with three rows and six columns enclosed by the solid line in FIG. 3, and one symbol in each portion of areas (auxiliary display areas) 712 arranged on upper, lower, left, and right sides of the area 711 for combinations of input symbol candidates and enclosed by the broken lines in FIG. 3, respectively. Note that the auxiliary display areas 712 arranged on the upper, lower, left, and right sides are auxiliary areas used to display, in the adjacent area 711 for combinations of input symbol candidates, symbols in an auxiliary display area 712 according to the direction selected by the user pressing any of direction keys. The concept of "matrix" in this application includes a concept of matrix in which the arrangement in the left-to-right direction is defined as "row" and the arrangement in the top-to-bottom direction is defined as "column," in addition to the concept of general matrix in which the arrangement in the left-to-right direction is defined as "column" and the arrangement in the top-to-bottom direction is defined as "row." Alternatively, the symbols can be arranged in any pattern, such as concentric circles or a star.

The input means 30 can include a user interface that receives a display content changing operation through the direction keys 721 on the operational panel 72 of the authentication board 70 to send the display means 20 a signal corresponding to the operation. Further, the input means 30 receives an input confirmation operation through an input button 722 on the operational panel 72 of the authentication board 70 to send the display means 20 a signal corresponding to the operation. The input means 30 can also receive an operation through the replace keys 723, as the display content changing operation, for replacing all the displayed characters on the display 71 of the authentication board 70 at random to send the display means 20 a signal corresponding to the operation. When receiving the instruction from the input means 30, the display means 20 displays a plurality of symbols in a plurality of portions of each column in the matrix area as a combination of input symbol candidates. Alternatively, the input means can be used to select a group of symbol candidates.

The determination means 40 can include a programmed computer or processor that selects one or more input symbols for each digit of the password from combinations of input symbol candidates displayed by the display means 20 based on the selection information corresponding to the digit to determine whether the one or more input symbols include the correct answer symbol corresponding to the digit.

If it is determined by the determination means 40 that correct answer symbols for all the digits of the password are included, the authentication means 50 authenticates that the password is entered correctly.

Each of these means is implemented as functional means by the CPU executing a program stored in the RAM or ROM of the password authentication apparatus 100, or on an external storage medium.

Figure 4:
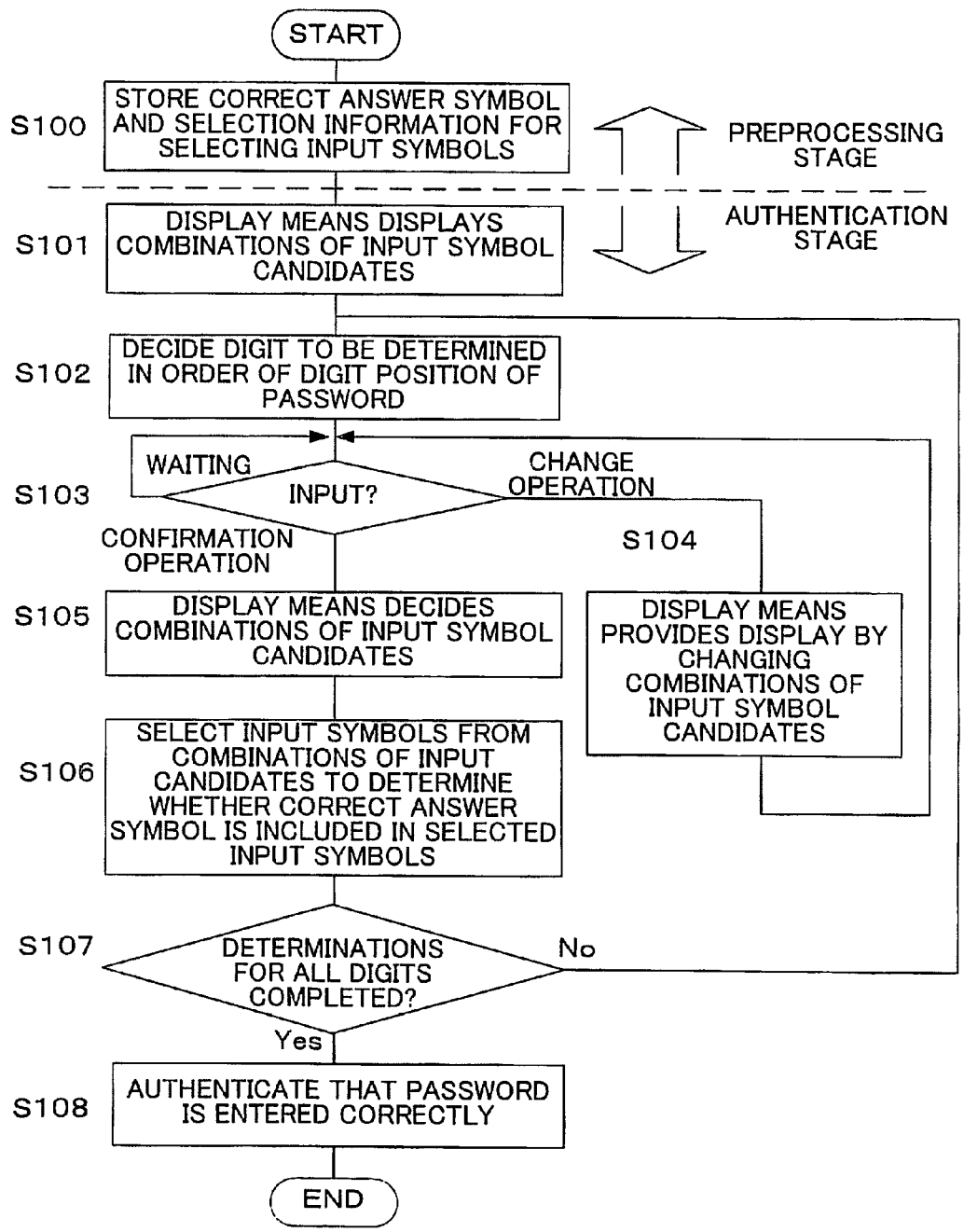
FIG. 4 is a flowchart illustrating a processing content of the password authentication apparatus according to a representative embodiment.

Referring next to a flowchart of FIG. 4, the operation of the password authentication apparatus 100 will be described. The processing steps can be executed by changing the order of processing steps voluntarily within the range in which each processing step is consistent with the processing content, or in parallel. Note that, in the embodiment of the password authentication apparatus 100, it is assumed that symbols used for passwords and their authentication are 26 alphabetic characters. Additionally, the symbols can also include numerals, characters from various languages, punctuation symbols, glyphs, or any other symbols. It is also assumed that the selection information stored for each digit of a password is specified column information for specifying a column in an area arranged by the display means 20 in a matrix.

First, the password authentication apparatus 100 stores in the storage means 10 a correct answer symbol and the specified column information for selecting input symbols for each digit of a password of an authorized user at a preprocessing stage executed before an authentication stage (S100). The password and the specified column information stored are specified by the authorized user or by the password authentication apparatus 100. In the latter case, the determined content is notified in advance to the authorized user by e-mail or the like.

In the following, it is assumed as an example that "YBCD" is stored as the password and "1234" is stored as the selection information, i.e., the specified column information corresponding to respective digits of the password.

At the authentication stage, the display means 20 displays alphabetic characters at random as input symbols in respective portions of the matrix area, i.e., it displays combinations of input symbol candidates (S101).

Next, the password authentication apparatus 100 decides a digit to be determined in order of digit position of the password (S 102). For example, the password authentication apparatus 100 initially decides the first digit of the password as the digit to be authenticated.

Then, the input means 30 waits for a user operation (S103). Namely, the input means 30 maintains the waiting state until receiving a user operation (waiting in S103).

When receiving a display change operation as the user operation (change operation in S 103), the input means 30 sends the display means 20 a signal corresponding to the operation and the display means 20 receiving the signal provides a display by changing the combinations of input symbol candidates according to the signal (S104). After the processing step S104, the input means 30 returns to the processing step S103 to wait for the next user operation.

Figure 5:
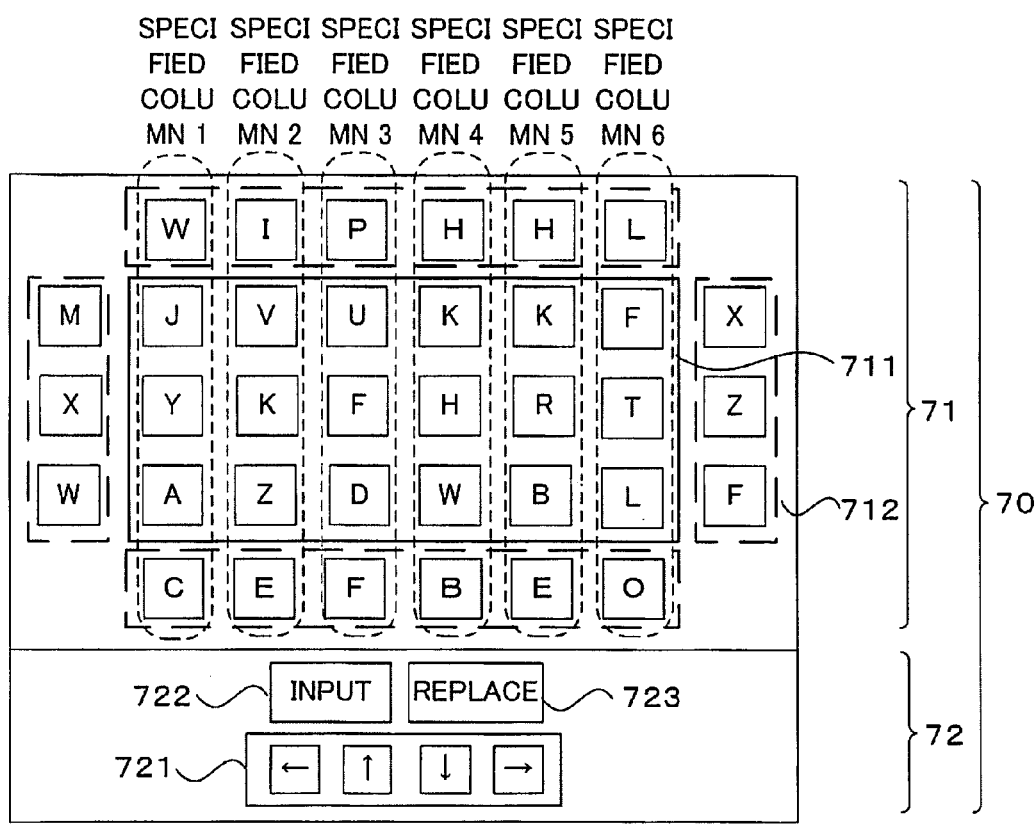
FIG. 5 is an illustration of another example of the authentication board of the password authentication apparatus according to a representative embodiment.

Suppose here that the user enters "Y" for the first digit of the password based on the specified column information "1" corresponding to "Y." Explaining this case with reference to FIG. 3, the user looks for "Y" from the characters displayed on the display 71 and presses twice a left arrow button in the direction keys 721 so that "Y" will be displayed in a specified column 1. FIG. 5 illustrates the resulting display provided by the display means 20 when the user performed the operation. It can be seen from FIG. 5 that characters "JYA" are displayed in respective portions of the specified column 1.

On the other hand, when receiving a confirmation operation as the user operation (confirmation operation in S103), the input means 30 sends the determination means 40 a signal corresponding to the operation, and the determination means 40 receiving the signal decides symbols displayed in the respective portions of each specified column as a combination of input symbol candidates (S105). For example, when a display as illustrated in FIG. 5 is provided by the display means 20 on the display, if the user presses the input button 722, the determination means 40 determines "JYA," "VKZ," "UFD," "KUW," "XZF," and "MXW" as combinations of input symbol candidates.

Next, the determination means 40 selects one or more input symbols from the decided combinations of input symbol candidates based on the specified column information corresponding to the determined digit to determine whether a correct answer symbol corresponding to the digit is included in the selected input symbols (S106). In other words, if the first digit of the password is to be determined, the determination means 40 reads, from the storage means 10, the correct answer symbol "Y" and the specified column information "1" corresponding to the first digit, and selects the input symbol combination "JYA" corresponding to the first column based on the specified column information "1" from the combinations of input symbol candidates ("JYA," "VKz," "UFD," "KHW," "XZF," and "MXW") decided in the processing step S105 to determine whether selected "JYA" includes the correct answer symbol "Y" corresponding the first digit.

Then, if the determinations for all the digits are not completed (No in S107), the password authentication apparatus 100 repeats the processing steps S101 to S106. In other words, the password authentication apparatus 100 performs processing for the second and subsequent digits "B," "C," and "D" in the same manner as for the first digit "Y." Upon completion of checking for all the digits (Yes in S107), the password authentication apparatus 100 proceeds to the next processing step S108.

Then, if the determination means 40 has determined that correct answer symbols for all the digits of the password are included, the authentication means 50 authenticates that the password is entered correctly (S108).

Thus, according to the password authentication apparatus 100 of the embodiment, since the user's input operation is limited to only the operation for displaying the combinations of input symbol candidates for each digit of the password, the risk of password information leakage to a third party who has peeped at the display can be reduced. In other words, according to the password authentication apparatus 100 of the embodiment, even if the third party has peeped at the user's input operation, the third party can obtain only the shift direction of the characters displayed on the screen and the input symbol candidate combination information as a result of replacing the characters. Since the third party does not know the specified column information for each digit of the password, the third party cannot know which symbols the user entered for the password. In the above-mentioned embodiment, the input symbol candidates for each digit of the password contain up to 18 characters (three rows by six columns) if there is no overlapping of the input symbols. Therefore, if the number of password digits is four, the number of combinations considered to be input symbols entered by the user is 184. Since the third party can know only the 184 combinations of input symbols even if peeping at the user's input operation, it means that it is difficult for the third party to know the password (the correct combination of input symbols).

(Modification 1)

In modification 1 of the embodiment, the determination means 40 is allowed to cyclically determine the symbol string of the password in addition to the determination of the symbol string of the password in order of digit position of the password. Here, the cyclic determination means that the determination means determines all the digits of the password on condition that a digit to be first determined may be any digit, and subsequent digits to be determined after the digit first determined are selected in order of digit position (i.e., if the digit first determined is the last digit of the password, the order of determination returns to the first digit). For example, as in the above-mentioned embodiment, if the password consists of four digits, "YBCD," the determination means 40 performs the processing step S106 on the four correct answer symbol strings "YBCD," "BCDY," "CDYB," and "DYBC," and the combination of corresponding selection information.

According to the modification 1 of the embodiment, even if the third party has taken multiple peeping photos, the risk of password information leakage can be reduced. In other words, when peeping photos or video of the user's input operations have been taken by the third party, the third party can compare the peeping images to check matching input symbols in order to narrow down the password candidates. However, if the cyclic determination is allowed as in the modification 1, since the correct answer symbol strings used to determine the correct inputs, for example, by the first input operation of the password and the second input operation of the password do not always agree, this makes it difficult for the third party to compare the peeping images in order to narrow down the password candidates. As a result, even if the third party has taken multiple peeping photos, the risk of password information leakage can be further reduced.

(Modification 2)

In modification 2 of the embodiment, the display means 20 displays a different symbol in each portion included in the same column, respectively. According to the above-mentioned embodiment, the display means 20 displays different alphabetic characters in three portions (in three rows), or five portions if the auxiliary display areas are used, respectively.

According to the modification 2 of the embodiment, even if the third party has taken multiple peeping photos, the risk of password information leakage can be further reduced. In other words, since a different symbol is displayed in each portion of one column, the number of combinations of input symbols capable of being narrowed down by one peeping photo is increased. This makes it difficult for the third party to compare peeping photos in order to narrow down the password candidates. As a result, even if the third party has taken multiple peeping photos, the risk of password information leakage can be further reduced.

(Modification 3)

In modification 3 of the embodiment, even if the determination means 40 determines that correct answer symbols for digits equal to or more than (p−a) digits of the password (p denotes the number of digits of the password, where $0 \leq a < p$) are included, the authentication means 50 authenticates that the password is entered correctly. In other words, even if the determination means 40 selects one or more input symbols from the combinations of input symbol candidates and determines that the correct answer symbol corresponding to the digit is not included in the selected one or more input symbols, the authentication means 50 authenticates that the password is entered correctly.

For example, when the number of password digits is four (p=4), if the determination means 40 determines that correct answer symbols for digits equal to or more than three digits of the password are included, the authentication means 50 authenticates that the password is entered correctly. According to the embodiment, the authentication means 50 authenticates that the password is entered correctly only when the correct answer symbols for all the digits are included. Therefore, a person(s) who has taken multiple peeping photos can compare the peeping photos to narrow down the password candidates on condition that the correct answer symbols are always included in the input symbol candidates. However, according to the modification 3, since the number a of digits can be wrong input upon one password input, the multiple peeping photos have to be compared to narrow down the password candidates by considering such a case that the correct answer symbol is not included in the input symbol candidates. Therefore, the password candidates cannot be derived merely by checking peeping images for the common digit upon different attempts.

Thus, according to the modification 3 of the embodiment, even if the third party has taken multiple peeping photos, the leakage of the password information can be further prevented.

(Modification 4)

In modification 4 of the embodiment, the password authentication apparatus 100 is capable of appropriately changing each of the above-mentioned parameters, i.e., the number k of rows and the number j of columns of the display means, the number n of data selectable as correct answer symbols of the password, and the number p of digits of the password.

Figure 6:
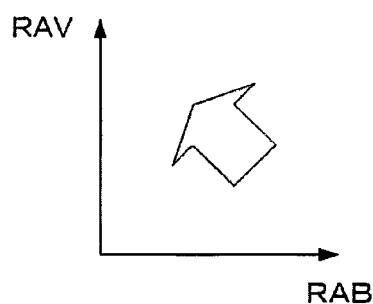
FIG. 6 contains schematic graphs illustrating the relationship between each parameter and the resistance against two attacks to the password authentication apparatus according to a representative embodiment.
Figure 6:
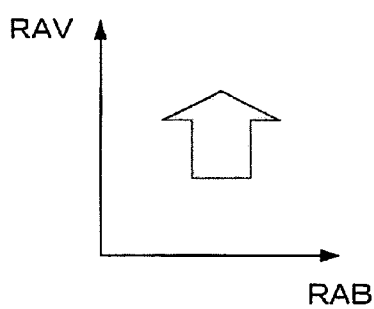
Figure 6:
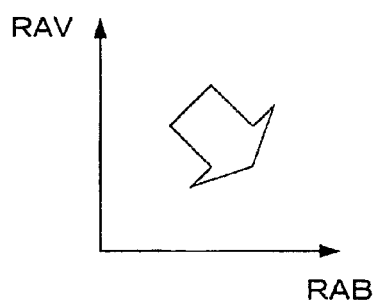
Figure 6:
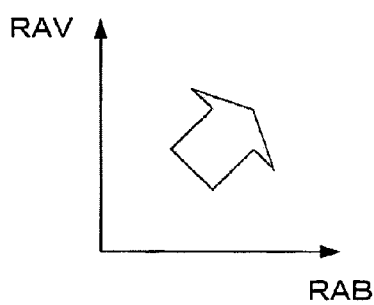

In general, there are at least two techniques for narrowing down the password performed by the third party, i.e., a video recording attack, allowing the third party to analyze the peeping images, and a brute-force attack, in which the third party, other than the authorized user, who does not know the password information, enters password candidates in a blind way. FIG. 6 illustrates changes the leakage resistance against two kinds of attacks, i.e., RAV (Resistance Against Video recording attack) and RAB (Resistance Against Brute-force attack), when each parameter (k, j, n, p) is increased or decreased. As illustrated in FIGS. 6(A) and 6(B), the number k of rows or the number j of columns has only to be increased to increase only RAV. As illustrated in FIG. 6(C), the number n of data has only to be increased to increase only RAB. Further, as illustrated in FIG. 6(D), if both RAV and RAB need to be increased, the number p of password digits has only to be increased.

Thus, according to the modification 4 of the embodiment, each parameter can be changed appropriately according to the conditions required depending on the use environment to provide an authentication apparatus capable of adjusting RAV (Resistance Against Video recording attack) and RAB (Resistance Against Brute-force attack) to meet various required conditions.

(Other Modifications)

The above described the password authentication apparatuses and the password authentication methods according to the embodiment and modifications 1 to 4 of the embodiment of the present disclosure. However, those skilled in the art can make additions, changes, and omissions appropriately within the technical scope of the present disclosure.

For example, although the embodiment illustrates the display means for displaying one symbol, selected from a group of plural symbols, in each portion of the matrix with three rows and six columns, the present disclosure is not limited to the matrix with three rows and six columns. It can be changed to a matrix with n rows and m columns ($n \geq 1$ and $m \geq 2$) depending on the use environment. Further, a plurality of data elements are arranged in the matrix for the convenience of user input, but the present disclosure is not limited thereto. For example, the data elements can be arranged in a variety of ways, such as to arrange the data elements concentrically.

Further, in the representative embodiments, although the display means is configured to display a plurality of data elements, the present disclosure is not limited thereto. For example, a method can be used, which allows the user to enter one character at a time, n times ($n \geq 2$) for each password digit, as input symbol candidates to select which input symbol candidate should be used based on the selection information corresponding to the digit.

Further, in the embodiment, although the selection information is the specified column information specifying a column in the matrix area of the display means, the present disclosure is not limited thereto, and the selection information may be information specifying any of the plurality of portions of the area. For example, the password authentication apparatus or method is capable of setting the selection information as specified row information specifying a row of the matrix area of the display means. In addition, the password authentication apparatus or method also allow the user to decide the information appropriately according to any rule including group 1 specifying one row and one column, two rows and two columns, and three rows and three column, group 2 specifying two rows and one column, three rows and two columns, and four rows and three columns, and so on.

Further, although the embodiment described the case where the display means displays the combinations of input symbol candidates by changing the symbol displayed in each portion to a symbol displayed in a portion adjacent in the row or column direction, the present disclosure is not limited thereto. For example, the display means can display the combinations of the input symbol candidates when the user presses the replace button to display, in the specified column, the correct answer symbol for each digit of the password. Further, although the embodiment described the case where the user operates the operation buttons on the authentication screen of the display means, the present disclosure is not limited thereto, and the display means can use speech recognition instead of the operation buttons.

What is claimed is:

1. A password authentication apparatus comprising:
a storage device for storing selection information for selecting at least one input symbol and a correct answer symbol for each digit of a password;
a display device for displaying combinations of input symbol candidates based on user operation;
a determination device for selecting, when a confirmation operation of the input symbol candidates input by a user is received, for each digit of the password, one or more input symbols from the combinations of input symbol candidates displayed by the display device based on the selection information corresponding to the digit to determine whether the correct answer symbol corresponding to the digit is included in the selected one or more input symbols; and
an authentication device for authenticating that the password is entered correctly when the determination device determines that correct answer symbols for all the digits of the password are included, wherein
the display device displays one symbol, selected from a group of plural symbols including the correct answer symbol, in each portion arranged in a matrix with n rows and m columns ($n \geq 1$ and $m \geq 2$);
the selection information stored in the storage device is specified column information specifying a column of the matrix area or specified row information specifying a row of the matrix area of the display device;
the combinations of input symbol candidates are plural symbols displayed in the plural portions of the area of the display device; and
the determination device cyclically determines a symbol string of the password in order of digit position for each digit of the password.

2. The password authentication apparatus according to claim 1, wherein the display device displays the combinations of input symbol candidates by changing the symbol displayed in each portion to a symbol displayed in a portion adjacent in the row or column direction.

3. The password authentication apparatus according to claim 1, wherein the display device displays a different symbol in each portion included in the column or TOW.

4. The password authentication apparatus according to claim 1, wherein the determination device determines a symbol string of the password in order of digit.

5. A password authentication apparatus comprising:
a storage device for storing selection information for selecting at least one input symbol and a correct answer symbol for each digit of a password;
a display device for displaying combinations of input symbol candidates based on user operation;
a determination device for selecting, when a confirmation operation of the input symbol candidates input by a user is received, for each digit of the password, one or more input symbols from the combinations of input symbol candidates displayed by the display device based on the selection information corresponding to the digit to determine whether the correct answer symbol corresponding to the digit is included in the selected one or more input symbols; and
an authentication device for authenticating that the password is entered correctly when the determination device determines that correct answer symbols for all the digits of the password are included, wherein
the display device displays one symbol, selected from a group of plural symbols including the correct answer symbol, in each portion arranged in a matrix with n rows and m columns ($n \geq 1$ and $m \geq 2$);
the selection information stored in the storage device is specified column information specifying a column of the matrix area or specified row information specifying a row of the matrix area of the display device;
the combinations of input symbol candidates are plural symbols displayed in the plural portions of the area of the display device;
the authentication device authenticates that the password is entered correctly when the determination device determines that correct answer symbols for digits equal to or more than (p-a) digits of the password (p denotes the number of digits of the password, where $0<a<p$) are included; and
the determination device cyclically determines a symbol string of the password in order of digit position for each digit of the password.

6. A password authentication method comprising the steps of:
storing selection information for selecting at least one input symbol and a correct answer symbol for each digit of a password;
displaying combinations of input symbol candidates based on user operation;
selecting, when a confirmation operation of the input symbol candidates input by a user is received, for each digit of the password, one or more input symbols from the combinations of input symbol candidates displayed based on the selection information corresponding to the digit to determine whether the correct answer symbol corresponding to the digit is included in the selected one or more input symbols; and
authenticating that the password is entered correctly when it is determined that the correct answer symbols for all the digits of the password are included, wherein
the display device displays one symbol, selected from a group of plural symbols including the correct answer symbol, in each portion arranged in a matrix with n rows and m columns ($n \geq 1$ and $m \geq 2$);
the selection information is specified column information specifying a column of the matrix area or specified row information specifying a row of the matrix area;
the combinations of input symbol candidates are plural symbols displayed in the plural portions of the area; and
a symbol string of the password is determined cyclically in order of digit position for each digit of the password.

* * * * *

UNITED STATES PATENT AND TRADEMARK OFFICE
CERTIFICATE OF CORRECTION

PATENT NO. : 8,307,424 B2  
APPLICATION NO. : 12/354463  
DATED : November 6, 2012  
INVENTOR(S) : Hirakawa Page 1 of 1

It is certified that error appears in the above-identified patent and that said Letters Patent is hereby corrected as shown below:

In the Specifications:

In Column 2, Line 2, delete "form" and insert -- from --, therefor.

In Column 5, Line 7, delete "(S 102)." and insert -- (S102). --, therefor.

In Column 5, Line 14, delete "S 103)," and insert -- S103), --, therefor.

In Column 5, Line 41, delete ""KUW,"" and insert -- "KHW," --, therefor.

In Column 5, Line 55, delete ""VKz,"" and insert -- "VKZ," --, therefor.

In Column 5, Line 63, delete ""B."" and insert -- "B," --, therefor.

In the Claims:

In Column 9, Line 45, in Claim 3, delete "TOW." and insert -- row. --, therefor.

Signed and Sealed this  
Eleventh Day of June, 2013

Teresa Stanek Rea  
*Acting Director of the United States Patent and Trademark Office*